United States Patent
Chen et al.

(10) Patent No.: US 10,921,622 B2
(45) Date of Patent: Feb. 16, 2021

(54) ANTI-PEEPING CONTROL DEVICE AND BACKLIGHT MODULE AND DISPLAY USING SAME

(71) Applicant: Coretronic Corporation, Hsin-Chu (TW)

(72) Inventors: Ping-Yen Chen, Hsin-Chu (TW); Chung-Yang Fang, Hsin-Chu (TW); Yang-Ching Lin, Hsin-Chu (TW); Jen-Wei Yu, Hsin-Chu (TW); Yu-Fan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/364,203

(22) Filed: Mar. 26, 2019

(65) Prior Publication Data

US 2019/0293974 A1  Sep. 26, 2019

(30) Foreign Application Priority Data

Mar. 26, 2018  (CN) .......................... 201810253597.9

(51) Int. Cl.
  *G02F 1/13* (2006.01)
  *G02F 1/1335* (2006.01)
  *G02F 1/1337* (2006.01)
  *F21V 8/00* (2006.01)
  *G02F 1/13363* (2006.01)

(52) U.S. Cl.
  CPC ......... *G02F 1/1323* (2013.01); *G02B 6/0053* (2013.01); *G02F 1/1337* (2013.01); *G02F 1/13363* (2013.01); *G02F 1/133528* (2013.01); *G02F 1/133536* (2013.01); *G02F 2001/133531* (2013.01)

(58) Field of Classification Search
  None
  See application file for complete search history.

(56) References Cited

U.S. PATENT DOCUMENTS 7,880,843 B2  2/2011  Morishita et al.
8,982,300 B2  3/2015  Umemoto
(Continued)

FOREIGN PATENT DOCUMENTS

CN  1702517 A  11/2005
CN  101473168 A  7/2009
(Continued)

OTHER PUBLICATIONS

JP-2009020293-A Machine Translation (Year: 2009).*

*Primary Examiner* — James A Dudek

(57) ABSTRACT

An anti-peeping control device includes two polarizers and a liquid crystal box disposed between the two polarizers. An included angle of 5 to 15 degrees is formed between the axial directions of the transmission axes of the two polarizers, or the axial directions of the transmission axes of the two polarizers are parallel to each other but not parallel and not perpendicular to any side edge of the polarizer. The axial directions of the transmission axes of the two polarizers are perpendicular or parallel to the alignment direction of the alignment layer of the liquid crystal box. The anti-peeping control device can use an electronic control method to switch the anti-peeping effect. A backlight module and display using the anti-peeping control device are also proposed.

19 Claims, 11 Drawing Sheets

(56) References Cited

U.S. PATENT DOCUMENTS

| | | |
|---|---|---|
| 10,216,018 B2 | 2/2019 | Fang et al. |
| 2005/0206814 A1 | 9/2005 | Histake |
| 2009/0174843 A1 | 7/2009 | Sakai et al. |
| 2014/0232960 A1 | 8/2014 | Schwartz et al. |
| 2015/0208537 A1 | 7/2015 | Cho et al. |
| 2015/0277012 A1 | 10/2015 | Nakamura et al. |
| 2015/0346532 A1 | 12/2015 | Do et al. |
| 2017/0213874 A1 | 7/2017 | Liu et al. |
| 2018/0210243 A1 | 7/2018 | Fang et al. |
| 2019/0196236 A1 | 6/2019 | Chen et al. |

FOREIGN PATENT DOCUMENTS

| | | | |
|---|---|---|---|
| CN | 206920756 U | 1/2018 | |
| CN | 208126055 U | 11/2018 | |
| EP | 2051134 A1 | 4/2009 | |
| JP | 2008-96458 A | 4/2008 | |
| JP | 2009020293 A * | 1/2009 | ........... G02F 1/1323 |
| TW | 200613801 A | 5/2006 | |
| TW | 200624912 A | 7/2006 | |
| TW | 200807083 A | 2/2008 | |
| TW | I326367 B | 6/2010 | |
| TW | 201031969 A1 | 9/2010 | |
| TW | I356937 B | 1/2012 | |
| TW | 201350985 A | 12/2013 | |
| TW | 201403577 A | 1/2014 | |
| TW | 201610512 A | 3/2016 | |
| TW | M537663 U | 3/2017 | |
| TW | I612360 B | 1/2018 | |
| WO | 2016195786 A1 | 12/2016 | |
| WO | 2018130044 A1 | 7/2018 | |

\* cited by examiner

ANTI-PEEPING CONTROL DEVICE AND BACKLIGHT MODULE AND DISPLAY USING SAME

CROSS-REFERENCE TO RELATED APPLICATION

THIS APPLICATION CLAIMS THE PRIORITY BENEFIT OF CHINA APPLICATION (CN201810253597.9 FILED ON 2018 Mar. 26). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a light control device and an application thereof, and more particularly to an anti-peeping control device with switchable anti-peeping effects and capable of adjusting the anti-peeping direction and a display and a backlight module employing the anti-peeping control device.

BACKGROUND OF THE INVENTION

When using a display device especially a portable display device, a user often does not want other people to view the displayed content, and therefore, consumers are striving for a display device with anti-peeping function to make consumers have a sense of security and privacy.

At present, when a general display device has a need for anti-peeping switching, a common method is to place an anti-peeping film and an electronically controlled diffusing film on the display device or the backlight module; however, this means consumes a large amount of power. Another way is using a backlight module that combines a narrow viewing angle and a wide viewing angle function and controlling different light sources to achieve anti-peeping or sharing effects, but the design has a poor anti-peeping effect.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an anti-peeping control device, which uses an electronic control method to switch the anti-peeping effect.

The invention provides a backlight module, which uses an anti-peeping control device to change the light emitting angle of the provided surface light source.

The invention provides a display to achieve an anti-peeping control effect.

Other objectives and advantages of the invention can be further understood from the technical features disclosed by the invention.

In order to achieve one or partial or all of the above objectives or other objectives, an anti-peeping control device provided by an embodiment of the invention includes a first polarizer, a second polarizer and a liquid crystal box. The first polarizer includes a first transmission axis having a first axial direction. The second polarizer is disposed opposite to the first polarizer. The second polarizer includes a second transmission axis having a second axial direction. A relationship between the first transmission axis and the second transmission axis satisfies at least one of the following conditions: (1) an included angle is formed between the first axial direction and the second axial direction, and the included angle is between 5 degrees and 15 degrees; and (2) the first axial direction is parallel to the second axial direction, the first axial direction is not parallel and not perpendicular to any side edge of the first polarizer, and the second axial direction is not parallel and not perpendicular to any side edge of the second polarizer. The liquid crystal box is disposed between the first polarizer and the second polarizer. The liquid crystal box includes a first alignment layer, a second alignment layer and a liquid crystal material. The liquid crystal material is disposed between the first alignment layer and the second alignment layer. An included angle between a first alignment direction of the first alignment layer and the first axial direction is selected from one of 0±5 degrees and 90±5 degrees. An included angle between a second alignment direction of the second alignment layer and the second axial direction is selected from one of 0±5 degrees and 90±5 degrees.

In order to achieve one or partial or all of the above objectives or other objectives, a backlight module provided by an embodiment of the invention includes an optical plate, a light source and the aforementioned anti-peeping control device. The optical plate has a light incident surface and a light emitting surface. The light source is disposed on a side of the light incident surface. The anti-peeping control device is disposed opposite to the light emitting surface of the optical plate. The first polarizer faces the optical plate.

In order to achieve one or partial or all of the above objectives or other objectives, a display provided by an embodiment of the invention includes a display panel and the aforementioned backlight module. The display panel includes a panel module. The display panel is disposed on a side of the anti-peeping control device away from the optical plate or between the optical plate and the anti-peeping control device.

The anti-peeping control device of the embodiment of the invention adopts a configuration in which an angle of 5 degrees to 15 degrees is formed between the two transmission axes of the two polarizers, or the axial directions of the two transmission axes of the two polarizers are not parallel and not perpendicular to any side edge of the polarizer, and the alignment directions of the two alignment layers of the liquid crystal box are parallel or perpendicular to the two transmission axes for anti-peeping control, so that the anti-peeping control can be achieved by whether applying a voltage on the liquid crystal box. In the backlight module of the embodiment of the invention, the light emitting angle of the provided surface light source can be changed by the anti-peeping control device, so that the display employing the backlight module can achieve an asymmetric anti-peeping effect.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
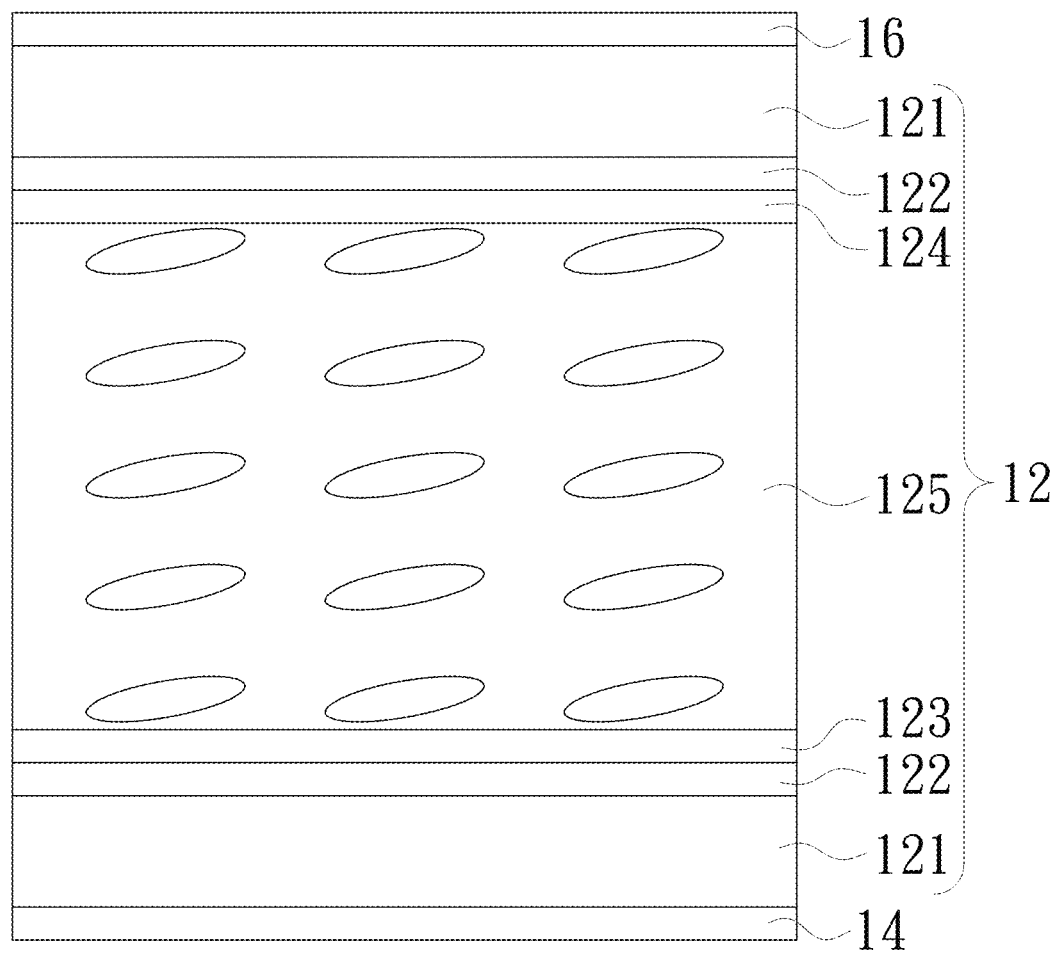
FIG. 1 is a schematic cross-sectional structural view of an anti-peeping control device according to an embodiment of the invention.

FIG. 1 is a schematic cross-sectional structural view of an anti-peeping control device according to an embodiment of the invention. As shown in FIG. 1, the anti-peeping control device 10 includes two polarizers and a liquid crystal box 12. The two polarizers are the first polarizer 14 and the second polarizer 16. The first polarizer 14 and the second polarizer 16 are disposed opposite to each other. The liquid crystal box 12 is disposed between the first polarizer 14 and the second polarizer 16. The liquid crystal box 12 includes a first alignment layer 123, a second alignment layer 124 and a liquid crystal material 125. The liquid crystal material 125 is disposed between the first alignment layer 123 and the second alignment layer 124, wherein the first alignment layer 123 is adjacent to the first polarizer 14 and the second alignment layer 124 is adjacent to the second polarizer 16. In addition, the liquid crystal material 125 may be selected from one of a positive liquid crystal and a negative liquid crystal, wherein the negative liquid crystal is commonly used for a vertical alignment (VA) liquid crystal display, and a positive liquid crystal is commonly used for a twisted nematic (TN) liquid crystal display. The liquid crystal box 12 of the anti-peeping control device 10 of the embodiment further includes, for example, two substrates 121 and two electrode layers 122. The two substrates 121 are disposed between the first polarizer 14 and the second polarizer 16, and the first alignment layer 123, the second alignment layer 124 and the liquid crystal material 125 are disposed between the two substrates 121. In an embodiment, the substrate 121 is a glass substrate or a plastic substrate. The two electrode layers 122 are disposed between the two substrates 121, and the first alignment layer 123, the second alignment layer 124 and the liquid crystal material 125 are disposed between the two electrode layers 122.

Figure 2A:
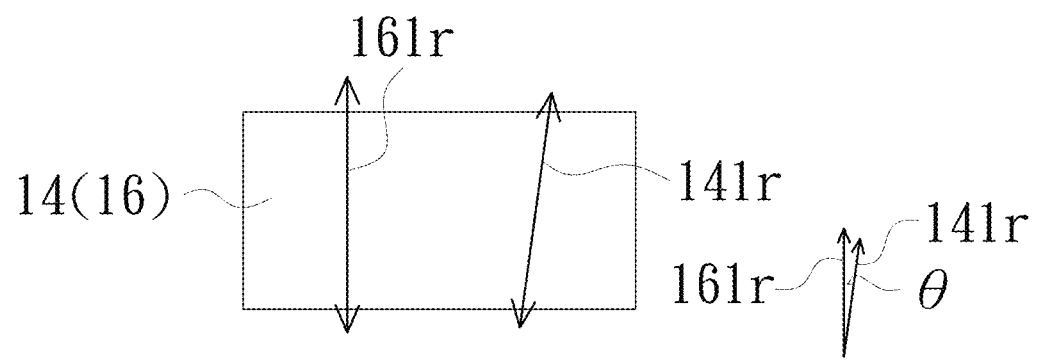
FIGS. 2a and 2b are respective schematic views showing the axial direction of the transmission axis of the polarizer and the alignment direction of the alignment layer in the anti-peeping control device according to a first embodiment of the invention.
Figure 2B:
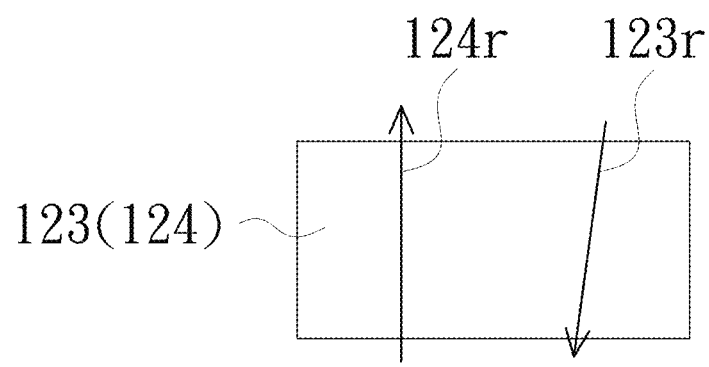

Please refer to FIGS. 2a and 2b, which are respective schematic views showing the axial direction of the transmission axis of the polarizer and the alignment direction of the alignment layer in the anti-peeping control device according to a first embodiment of the invention. To facilitate a better understanding, only the first polarizer 14 and the second polarizer 16 are illustrated for description in FIG. 2a, and only the first alignment layer 123 and the second alignment layer 124 are illustrated for description in FIG. 2b. The first polarizer 14 includes a first transmission axis having a first axial direction 141r. The second polarizer 16 includes a second transmission axis having a second axial direction 161r. An included angle θ is formed between the first axial direction 141r and the second axial direction 161r, and the included angle θ is between 5 and 15 degrees. In addition, the included angle between the first alignment direction 123r of the first alignment layer 123 and the first axial direction 141r is selected from one of 0±5 degrees and 90±5 degrees, that is, the first alignment direction 123r and the first axial direction 141r are substantially parallel or perpendicular to each other. The included angle between the second alignment direction 124r of the second alignment layer 124 and the second axial direction 161r is selected from one of 0±5 degrees and 90±5 degrees, that is, the second alignment direction 124r and the second axial direction 161r are substantially parallel or perpendicular to each other.

In an embodiment, as shown in FIG. 2a, the second axial direction 161r is perpendicular, and therefore the second transmission axis is, for example, 90 degrees; and the first axial direction 141r is slightly inclined, and therefore the first transmission axis is, for example, 90±(5-15) degrees. Correspondingly, as shown in FIG. 2b, the second alignment direction 124r is parallel to the second axial direction 161r, and therefore the second alignment direction 124r is, for example, 90 degrees; and the first alignment direction 123r is also parallel to the first axial direction 141r; and the invention is not limited thereto.

In the above embodiment, the anti-peeping control is achieved by combining forming an included angle of 5 to 15 degrees between the first axial direction 141r of the first transmission axis of the first polarizer 14 and the second axial direction 161r of the second transmission axis of the second polarizer 16 with whether applying a voltage on the liquid crystal box 12. In addition to the above-described anti-peeping control achieved by combining the included angle of 5 to 15 degrees between the first axial direction 141r and the second axial direction 161r with the adjustment of the first alignment direction 123r and the second alignment direction 124r, the following second embodiment further illustrates that the invention can also use two polarizers for the anti-peeping control with the design of the alignment direction of the alignment layer and the configuration in which the axial directions of the transmission axes of the two polarizers are parallel to each other but are not parallel and not perpendicular to any side edge of the polarizer, wherein the included angle between the alignment direction and the axial direction of the transmission axis is 0±5 degrees or 90±5 degrees.

Figure 3A:
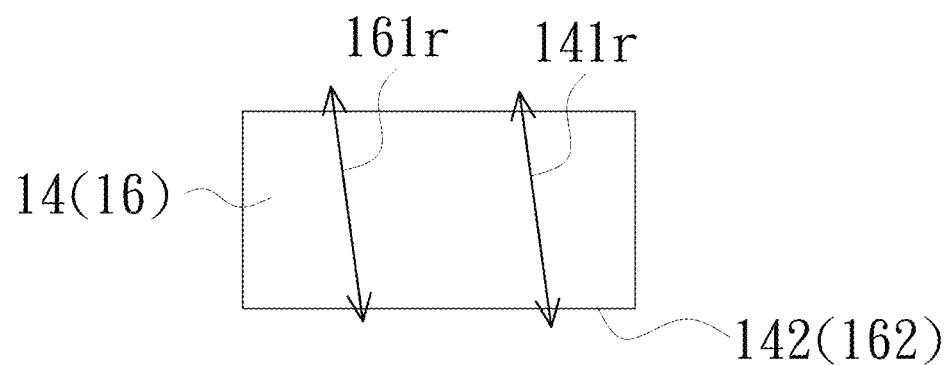
FIGS. 3a and 3b are respective schematic views showing the axial direction of the transmission axis of the polarizer and the alignment direction of the alignment layer in the anti-peeping control device according to the second embodiment of the invention.
Figure 3B:
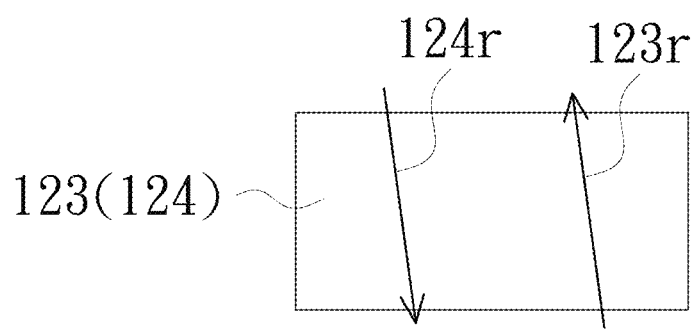

Please refer to FIGS. 3a and 3b, which are respective schematic views showing the axial direction of the transmission axis of the polarizer and the alignment direction of the alignment layer in the anti-peeping control device according to the second embodiment of the invention. As shown in FIG. 3a, the first axial direction 141r and the second axial direction 161r are parallel to each other. However, the first axial direction 141r and the second axial direction 161r are not parallel and are not perpendicular to any side edge of the first polarizer 14 or the second polarizer 16, such as the bottom edge 142 or 162. Correspondingly, as shown in FIG. 3b, the first alignment direction 123r is parallel to the first axial direction 141r, the second alignment direction 124r is parallel to the second axial direction 161r, but the invention is not limited thereto.

Figure 4:
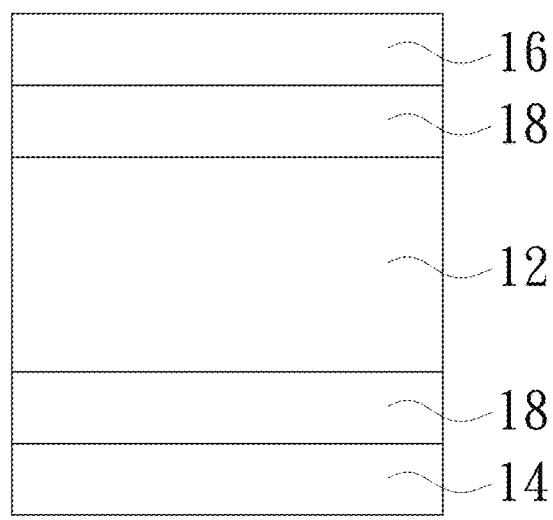
FIG. 4 is a schematic cross-sectional structural view of an anti-peeping control device according to another embodiment of the invention.

FIG. 4 is a schematic cross-sectional structural view of an anti-peeping control device according to another embodiment of the invention. As shown in FIG. 4, the anti-peeping control device 10a of the embodiment further includes one or at least one compensation film 18, as compared with the anti-peeping control device 10 described above. The compensation film 18 is disposed between the liquid crystal box 12 and the first polarizer 14, and/or between the liquid crystal box 12 and the second polarizer 16. The embodiment is exemplified by two compensation films 18, which are respectively disposed between the liquid crystal box 12 and the first polarizer 14 and between the liquid crystal box 12 and the second polarizer 16, but the invention is not limited thereto. Further, the type of the compensation film 18 may be a uniaxial structural compensation film of A-plate which means that the optical axis of the compensation film is parallel to the surface of the compensation film, a uniaxial structural compensation film of C-plate which means that the optical axis of the compensation film is perpendicular to the surface of the compensation film, a uniaxial structural compensation film of O-plate which means that the optical axis of the compensation film is inclined to the surface of the compensation film, a biaxial compensation film, or any combination of two or more. The selection of the single type of compensation film or the combination of any two or more types of compensation films is mainly to adjust the compensation value of in-plane optical path difference (Ro) and the compensation value of out-of-plane optical path difference (Rth). The range of Ro and Rth are selected as follows: Rth is between 100 nanometers (nm) and 800 nanometers, preferably 400±200 nanometers, more preferably 400±100 nanometers; Ro is less than 200 nanometers, preferably less than 50 nanometers. When the anti-peeping control device is applied to a display or a backlight module, the range of the shading angle of the display or backlight module at the azimuth angle can be enlarged when the uniaxial structural compensation film of A-plate, the uniaxial structural compensation film of C-plate, or the biaxial compensation film is selected. The range of shading angles of the display or backlight module at the elevation angle can be enlarged when the anti-peeping control device 10a selects the uniaxial structure compensation film of O-plate.

Figure 5:
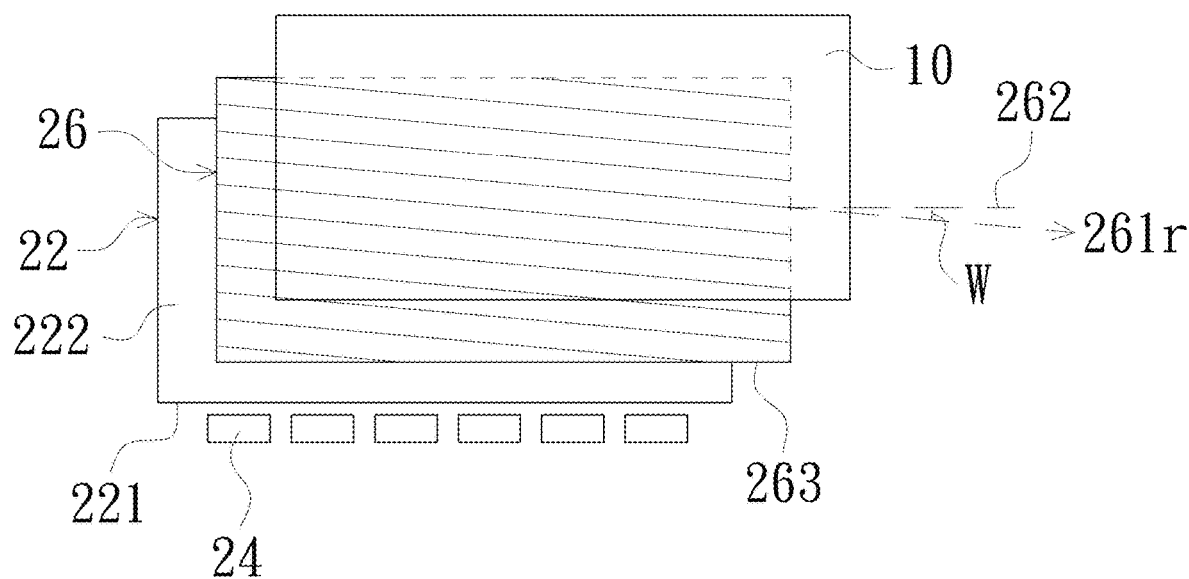
FIG. 5 is a schematic structural view of a backlight module with an anti-peeping control device according to an embodiment of the invention.

FIG. 5 is a schematic structural view of a backlight module with an anti-peeping control device according to an embodiment of the invention. As shown in FIG. 5, the backlight module 20 includes an optical plate 22, a light source 24 and an anti-peeping control device 10. The optical plate 22 of the embodiment is, for example, a light guide plate, and has a light incident surface 221 and a light emitting surface 222. The light source 24 is disposed on a side of the light incident surface 221. The anti-peeping control device 10 is disposed opposite to the light emitting surface 222 of the optical plate 22. In addition, the backlight module 20 may further include a reverse prism sheet 26. To facilitate the following description, the first polarizer 14 (shown in FIG. 1) of the anti-peeping control device 10 is defined as facing the optical plate 22. The reverse prism sheet 26 is disposed between the first polarizer 14 of the anti-peeping control device 10 and the light emitting surface 222 of the optical plate 22. The reverse prism sheet 26 has a plurality of prism columns (not shown) arranged in parallel and facing the light emitting surface 222 of the optical plate 22.

Figure 6:
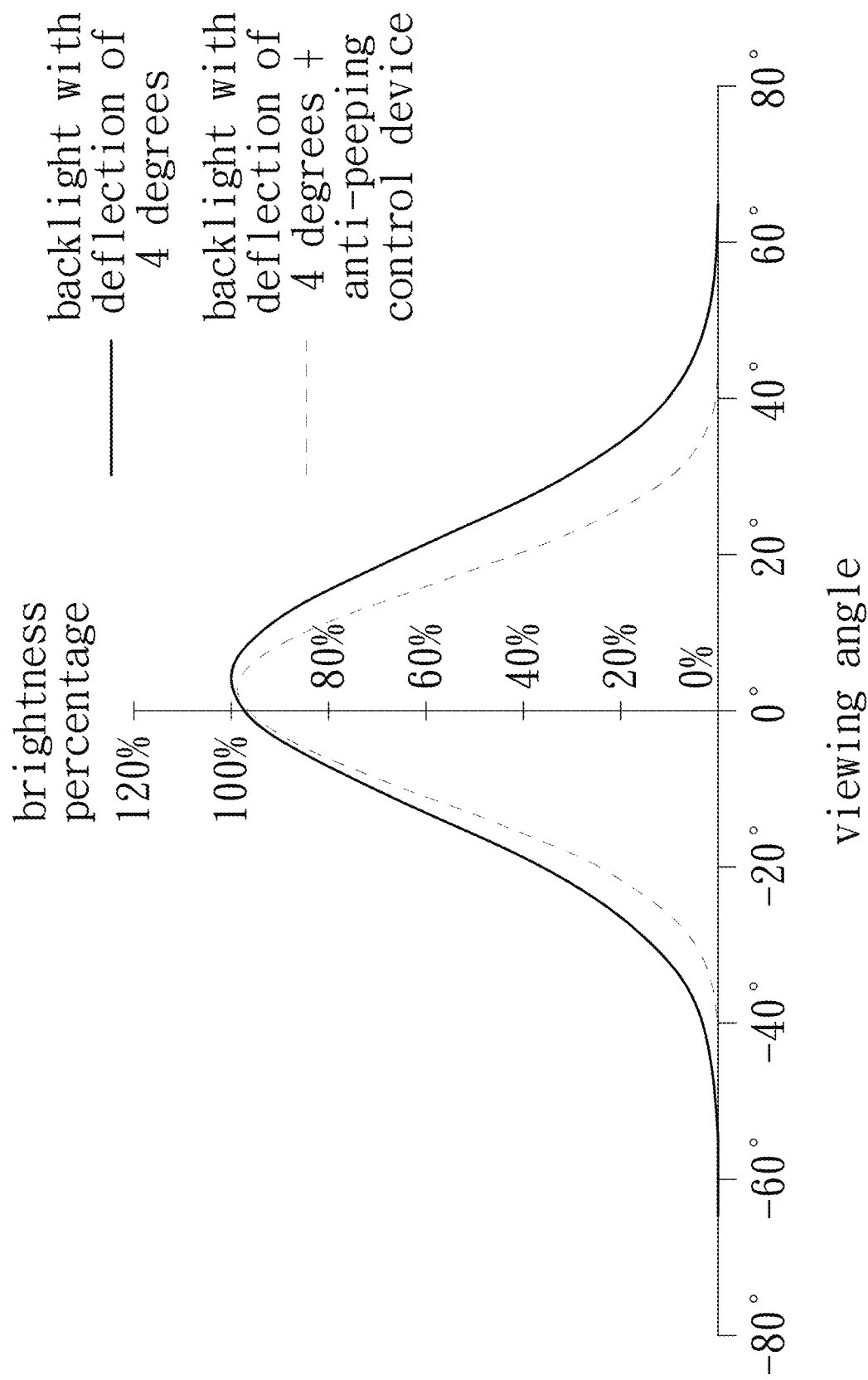
FIG. 6 is a schematic view of a viewing angle of a backlight module.

In an embodiment, when the backlight module 20 is combined with a display panel (not shown), in order to avoid a moiré pattern with the display panel, the extending direction 261r of the prism column of the reverse prism sheet 26 is not a horizontal line. The extending direction 261r of the prism column is deflected in a first direction with respect to a reference line 262 and therefore has a deflection angle W with the reference line 262, wherein the reference line 262 is perpendicular to any one of the opposite side edges of the prism sheet 26. In an embodiment, as shown in the reverse prism sheet 26 in FIG. 5, the bottom edge 263 or any line parallel to the bottom edge 263 of the reverse prism sheet 26 is used as the reference line 262, and the extending direction 261r of the prism column is deflected clockwise (first direction) with respect to the reference line 262, and therefore has the deflection angle W. The configuration of the anti-peeping control device 10 in the backlight module 20 of the embodiment can be used to adjust the viewing angle shift caused by the deflection angle W. Specifically, the anti-peeping control device 10 compensates the viewing angle shift so as to make the viewing angle symmetrical by the adjustment of the first axial direction 141r of the first transmission axis of the first polarizer 14, the second axial direction 161r of the second transmission axis of the second polarizer 16, the first alignment direction 123r and the second alignment direction 124r. FIG. 6 is a schematic view of the viewing angle of the backlight module. As shown in FIG. 6, when the deflection angle of the extending direction 261r of the prism column of the prism sheet 26 is clockwise deflection, for example, deflection of 4 degrees, and if the backlight module does not have the anti-peeping control device, then as illustrated by the solid line, the peak of the brightness percentage moves to the right with respect to the axis of the viewing angle of 0 degree, leading to the shift of the entire viewing angle. The dotted line is the viewing angle of the backlight module with the anti-peeping control device of the embodiment. As shown in FIG. 6, the viewing angle shift is corrected in the left direction, and the shifted viewing angle is moved back to make the viewing angle symmetrical.

Following the above description, in an embodiment, when the extending direction 261r of the prism column is deflected clockwise (the first direction) with respect to the reference line 262, the first axial direction 141r of the first transmission axis of the first polarizer 14 can be deflected counterclockwise (the second direction), and the first alignment direction 123r is also correspondingly deflected. In the above embodiment, the first direction is opposite to the second direction, but the invention is not limited thereto. Not all of the extending direction 261r of the prism columns of the reverse prism sheet 26 with the backlight is rotated clockwise, and not the first polarizer 14 or the second polarizer 16 of the anti-peeping control device 10 has to be deflected in a direction opposite to the first direction. Due to the design influence of the backlight module component, such as the direction, shape of net dot or prism angle, it is also possible that the extending direction 261r of the prism column of the reverse prism sheet 26 is rotated clockwise. Correspondingly, the first polarizer 14 or the second polarizer 16 of the anti-peeping control device 10 also rotates clockwise to counteract the viewing angle shift, or, in a specific usage situation, the anti-peeping control device 10 needs to be rotated clockwise to make the viewing angle shift larger.

The embodiment shown in FIG. 5 illustrates a situation where the backlight module is selectively provided with a reverse prism sheet. When the backlight module does not use a reverse prism sheet, the anti-peeping control device can achieve the asymmetric anti-peeping effect by adjusting the alignment direction of the alignment layer, that is, the luminance on the display in the two symmetrical viewing directions is different.

Figure 7:
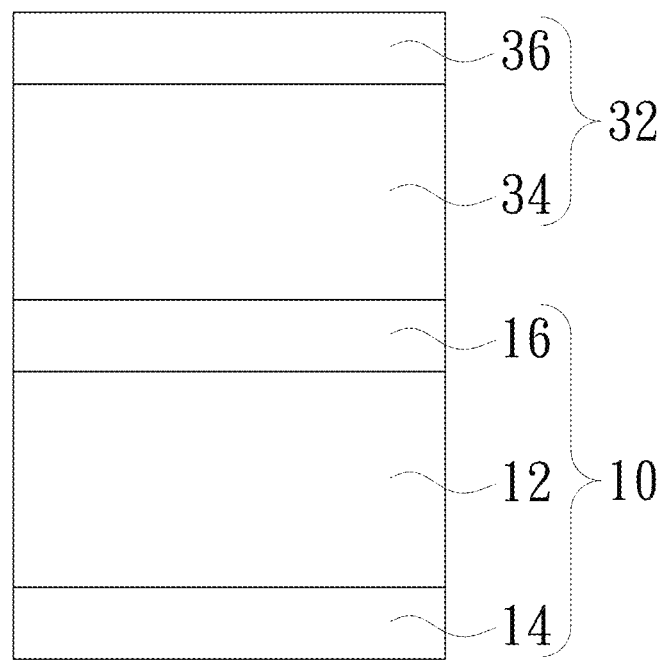
FIG. 7 is a schematic cross-sectional structural view of a display according to a first embodiment of the invention.

FIG. 7 is a schematic cross-sectional structural view of a display according to a first embodiment of the invention. As shown in FIG. 7, the display 30a includes an anti-peeping control device 10 and a display panel 32 stacked on the anti-peeping control device 10. The display panel 32 includes, for example, a panel module 34 and a third polarizer 36. The third polarizer 36 includes a third transmission axis having a third axial direction (not shown). The panel module 34 may be a self-illuminating panel module (e.g., an organic light emitting diode display panel module) or a non-self-illuminating panel module (e.g., a liquid crystal panel module), wherein the liquid crystal panel module may be an in-plane switching (IPS) panel module, but not limited thereto. When the panel module 34 is a non-self-illuminating panel module, the display 30a may further include the light source 24 and the optical plate 22 of the backlight module 20 in addition to the anti-peeping control device 10. To facilitate the following description, the configuration of the anti-peeping control device 10 is defined as that the first polarizer 14 is disposed under the liquid crystal box 12, and the second polarizer 16 is disposed on the liquid crystal box 12. In the display 30a of the first embodiment, the panel module 34 is disposed on the second polarizer 16, and the third polarizer 36 is disposed on a side of the panel module 34 away from the anti-peeping control device 10, that is, disposed on the panel module 34. In addition, if the panel module 34 is an organic light emitting diode display panel module, the anti-peeping control device is disposed on the light emitting direction side of the organic light emitting diode display panel module, and no polarizer is required under the organic light emitting diode display panel module.

Continuing with the above description where the panel module 34 is a non-self-illuminating panel module, in an embodiment, the anti-peeping control device 10 has a configuration where an included angle of 5 to 15 degrees is formed between the first axial direction 141r and the second axial direction 161r, for example, the first axial direction 141r is 10 degrees and the second axial direction 161r is 0 degrees, with the first alignment direction 123r is adjusted to be perpendicular or parallel to the first axial direction 141r (e.g., the first alignment direction 123r is 100 degrees) and the second alignment direction 124r is perpendicular or parallel to the second axial direction 161r (e.g., the second alignment direction 124r is 270 degrees).

Figure 8A:
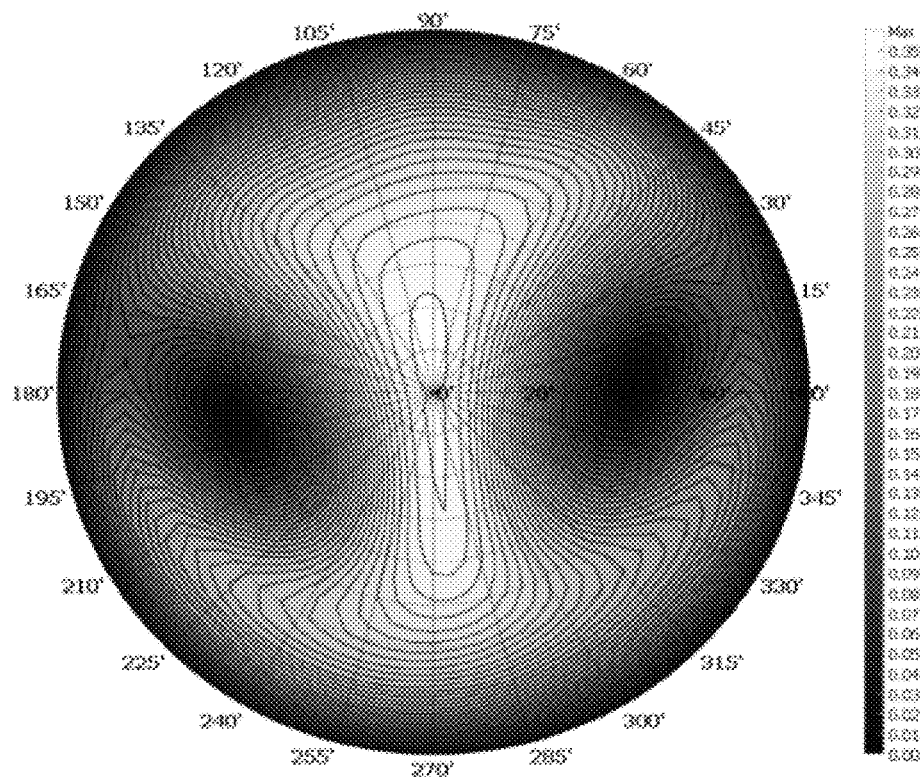
FIGS. 8a and 8b are respective schematic views showing the angular distribution of the display according to the first embodiment of the invention in the anti-peeping mode and the general mode.
Figure 8B:
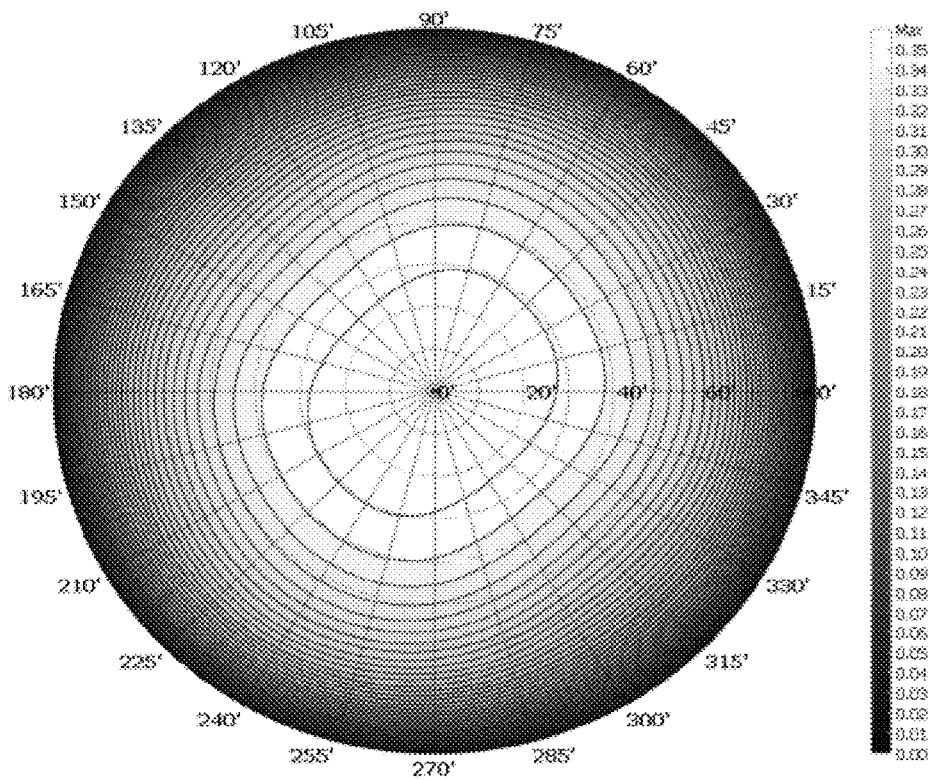

The display may have a special requirement such as it is necessary to achieve a left-right asymmetric anti-peeping effect. Taking the first axial direction 141r of the first polarizer 14 has a deflection of 10 degrees as an example, by the adjustment of the second axial direction 161r of the second polarizer 16, the first alignment direction 123r and the second alignment direction 124r of the anti-peeping control device 10 of the above embodiment, the display 30a can achieve an asymmetric anti-peeping effect or counteract the viewing angle shift caused by the deflection of the reverse prism sheet, and avoid vertical luminance drop. FIGS. 8a and 8b are respective schematic views showing the angular distribution of the display according to the first embodiment of the invention in the anti-peeping mode and the general mode. As shown in FIG. 8a, when a voltage is applied to the liquid crystal box 12 (the anti-peeping mode), an asymmetrical anti-peeping effect is achieved.

According to the above, in the display 30a of the embodiment, only the third polarizer 36 needs to be disposed on the panel module 34, and no polarizer is required to be disposed under the panel module 34, and the second polarizer 16 of the anti-peeping control device 10 is shared; however, the embodiment is not limited thereto. For example, a polarizer may be disposed under the panel module 34. Compared with the general design of a liquid crystal display panel in which the polarizer is required to be disposed above and below the panel module, the display 30a of the embodiment not only achieves the anti-peeping control effect, but also satisfies the need for cost and thickness reduction and brightness maintenance in the case where only three polarizers are used.

Figure 9:
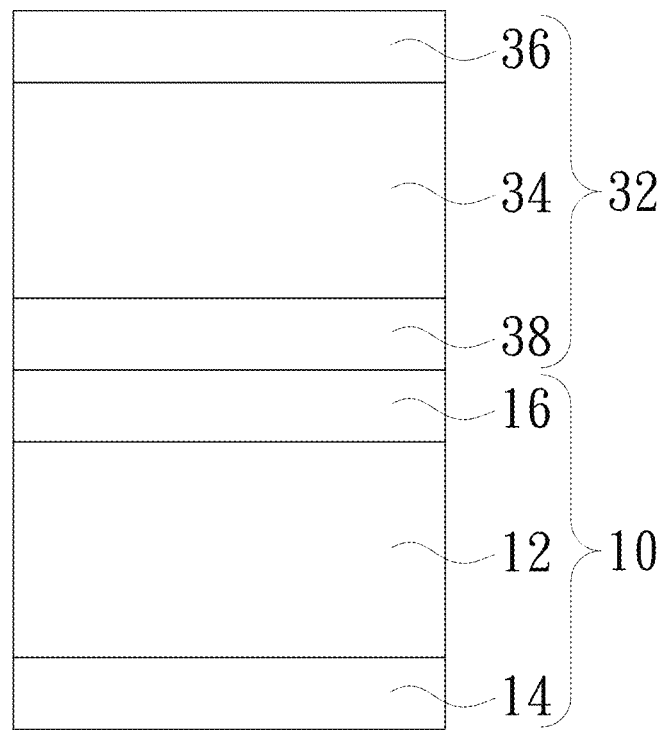
FIG. 9 is a schematic cross-sectional structural view of a display according to a second embodiment of the invention.

FIG. 9 is a schematic cross-sectional structural view of a display according to a second embodiment of the invention. As shown in FIG. 9, the display 30b includes an anti-peeping control device 10 and a display panel 32 stacked on the anti-peeping control device 10. The display panel 32 includes a panel module 34, a third polarizer 36 and a fourth polarizer 38. The third polarizer 36 includes a third transmission axis having a third axial direction (not shown), and the fourth polarizer 38 includes a fourth transmission axis having a fourth axial direction (not shown). In the display 30b of the second embodiment, the display panel 32 is disposed on the anti-peeping control device 10, the fourth polarizer 38 is disposed on the side of the panel module 34 facing the anti-peeping control device 10 (i.e., the fourth polarizer 38 is disposed below the panel module 34) and adjacent to the second polarizer 16, and the third polarizer 36 is disposed on the side of the panel module 34 away from the anti-peeping control device 10 (i.e., the third polarizer 36 is disposed on the panel module 34). In the embodiment, the anti-peeping control device 10 adopts a configuration in which the first axial direction 141r and the second axial direction 161r are parallel to each other but are not parallel and are not perpendicular to any side edge of the first polarizer 14 or the second polarizer 16, and the fourth axial direction of the fourth polarizer 38 and the second axial direction 161r of the second polarizer 16 are not parallel and are not perpendicular to each other. In another embodiment, the anti-peeping control device 10 adopts a configuration in which an included angle of 5 to 15 degrees is formed between the first axial direction 141r of the first polarizer 14 and the second axial direction 161r of the second polarizer 16, the fourth axial direction of the fourth polarizer 38 and the first axial direction 141r of the first polarizer 14 are not parallel and are not perpendicular to each other, and the fourth axial direction of the fourth polarizer 38 is parallel to the second axial direction 161r of the second polarizer 16.

Figure 10A:
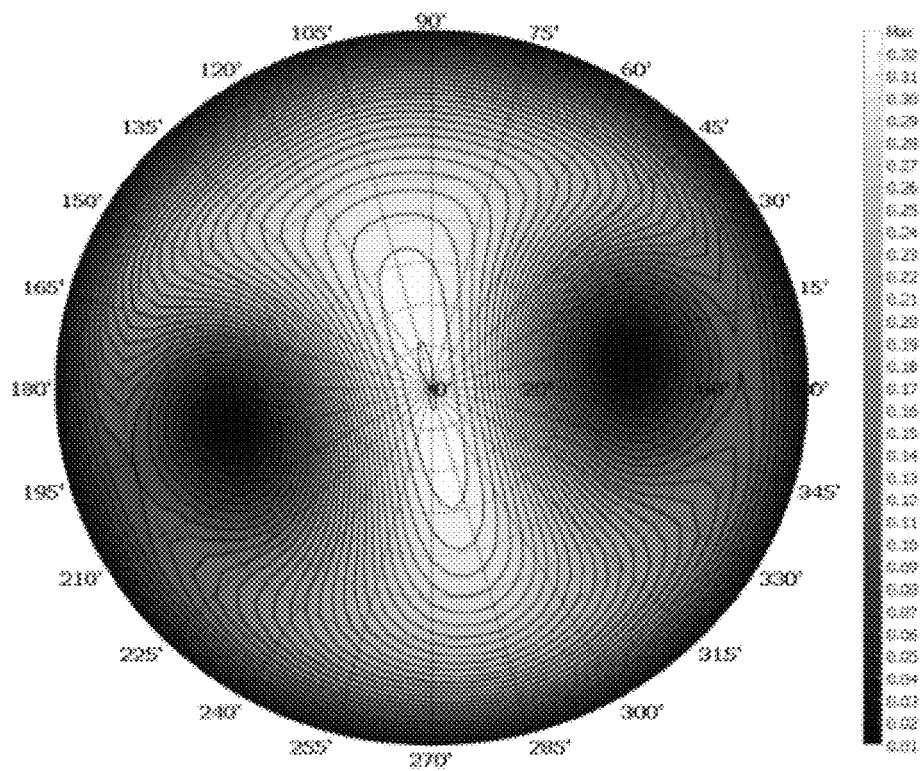
FIGS. 10a and 10b are respective schematic views showing the angular distribution of the display according to the second embodiment of the invention in the anti-peeping mode and the general mode.
Figure 10B:
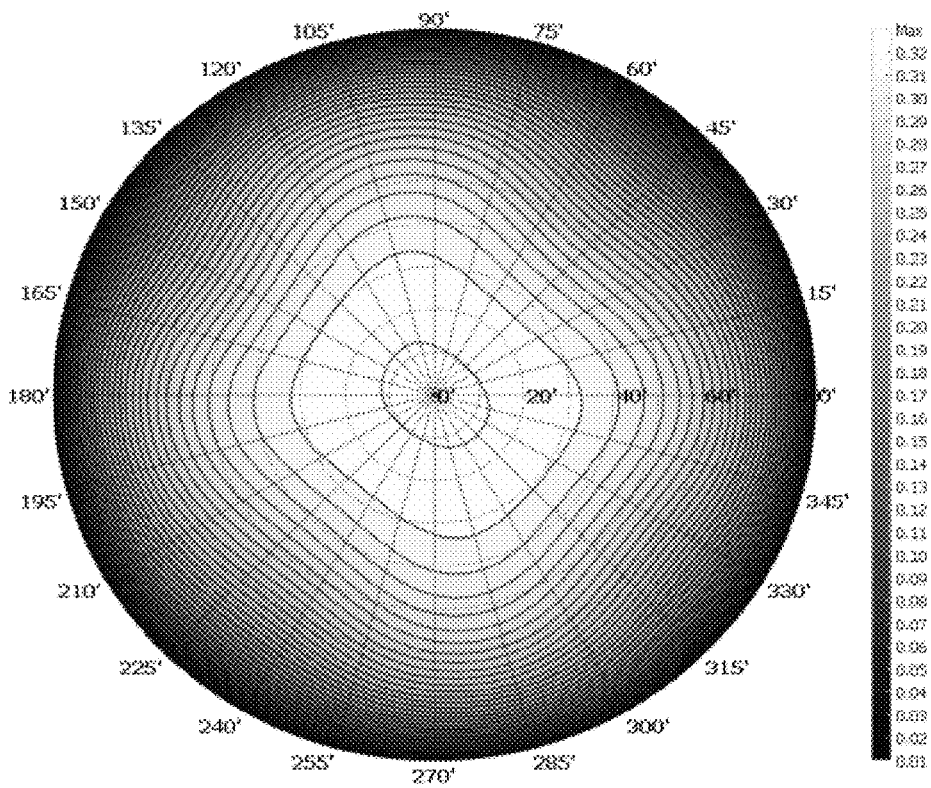

In the display 30b of the second embodiment, taking the first axial direction 141r of the first polarizer 14 having a deflection of 10 degrees as an example, the second axial direction 161r of the second polarizer 16 also has a deflection of 10 degrees. When the fourth transmission axis of the fourth polarizer 38 is 0 degrees, with the first alignment direction 123r is adjusted to be perpendicular or parallel to the first axial direction 141r (e.g., the first alignment direction is 100 degrees) and the second alignment direction 124r is perpendicular or parallel to the second axial direction 161r (e.g., the second alignment direction is 280 degrees), the display 30b can achieve an asymmetric anti-peeping effect or counteract the viewing angle shift caused by the deflection of the reverse prism sheet. FIGS. 10a and 10b are respective schematic views showing the angular distribution of the display 30b according to the second embodiment of the invention in the anti-peeping mode and the general mode. As shown in FIG. 10a, when a voltage is applied to the liquid crystal box 12 (the anti-peeping mode), an asymmetrical anti-peeping effect is achieved.

Figure 11:
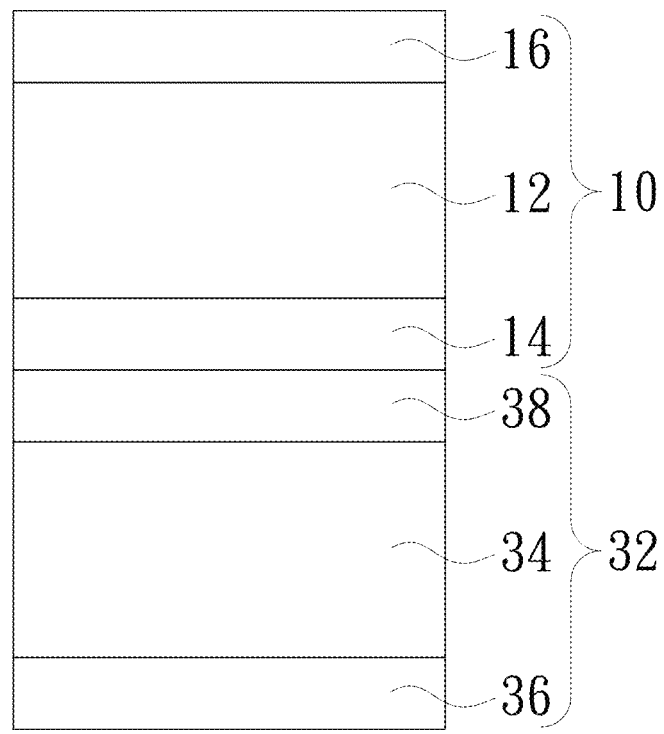
FIG. 11 is a schematic cross-sectional structural view of a display according to a third embodiment of the invention.

FIG. 11 is a schematic cross-sectional structural view of a display according to a third embodiment of the invention. As shown in FIG. 11, the anti-peeping control device 10 of the display 30c is disposed on the display panel 32. The first polarizer 14 of the anti-peeping control device 10 is a reflective polarizer. The second polarizer 16 is an absorbing polarizer. The first polarizer 14 faces the display panel 32. In addition, the display panel 32 includes a panel module 34, a third polarizer 36 and a fourth polarizer 38. The third polarizer 36 is disposed under the panel module 34. The fourth polarizer 38 is disposed on the panel module 34 and adjacent to the first polarizer 14 (reflective polarizer). In addition to having the effect of a polarizer, the disposition of the first polarizer 14 (reflective polarizer) can also reflect ambient light to enhance the anti-peeping effect. In addition, similar to the embodiment of FIG. 7, the fourth polarizer 38 of the embodiment may also be omitted, that is, the panel module 34 may share the first polarizer 14 of the anti-peeping control device 10.

Figure 12:
FIG. 12 is a schematic cross-sectional structural view of a display according to a fourth embodiment of the invention.

FIG. 12 is a schematic cross-sectional structural view of a display according to a fourth embodiment of the invention. As shown in FIG. 12, the display 30d includes a display panel 32 and a backlight module 20. The backlight module 20 includes a light source (not shown), an optical plate 22 and an anti-peeping control device 10. In the fourth embodiment, the anti-peeping control device 10 is disposed on the optical plate 22. The display panel 32 is disposed on the anti-peeping control device 10. The first polarizing plate 14 of the anti-peeping control device 10 faces the optical plate 22. A reverse prism sheet is selectively disposed between the first polarizer 14 and the optical plate 22 as needed. The display panel 32 respectively disposes a third polarizer 36 and a fourth polarizer 38 above and under the panel module 34. However, in the embodiment, the fourth polarizer 38 may be omitted, that is, the second polarizer 16 of the anti-peeping control device 10 may be shared under the panel module 34. In addition, a compensation film 18 is selectively disposed between the liquid crystal box 12 and the first polarizer 14 and between the liquid crystal box 12 and the second polarizer 16. The type of the compensation film 18 is disclosed above, and no redundant detail is to be given herein.

Figure 13:
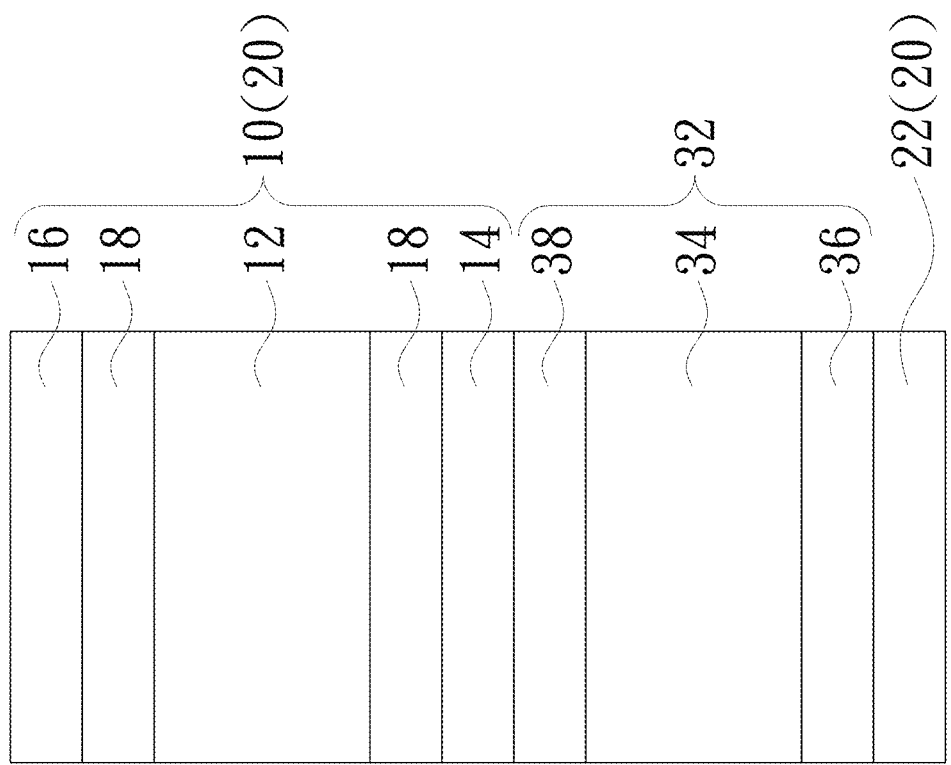
FIG. 13 is a schematic cross-sectional structural view of a display according to a fifth embodiment of the invention.

FIG. 13 is a schematic cross-sectional structural view of a display according to a fifth embodiment of the invention. As shown in FIG. 13, the display 30e is disposed with a backlight module 20. In the fifth embodiment, the display panel 32 is disposed on the optical plate 22, and the anti-peeping control device 10 is disposed on the display panel 32. The display panel 32 respectively disposes the fourth polarizer 38 and the third polarizer 36 above and under the panel module 34. The fourth polarizer 38 is adjacent to the first polarizer 14 (the first polarizer 14 may be a reflective polarizer as needed). However, the fourth polarizer 38 may be omitted in the embodiment, that is, the first polarizer 14 of the anti-peeping control device 10 may be shared above the panel module 34. In addition, a compensation film 18 is selectively disposed between the liquid crystal box 12 and the first polarizer 14 and between the liquid crystal box 12 and the second polarizer 16, or a compensation film 18 is selectively disposed between the liquid crystal box 12 and the first polarizer 14 or between the liquid crystal box 12 and the second polarizer 16 (not shown). The type of the compensation film 18 is disclosed above, and no redundant detail is to be given herein.

In summary, the invention can achieve the following effects:

1) An anti-peeping control is achieved by whether applying a voltage to the liquid crystal box of the anti-peeping control device, that is, the anti-peeping effect is switched by the electronic control method.

2) An asymmetric anti-peeping effect is achieved by adjusting the direction of the transmission axis of the polarizer according to the special needs of the display.

3) The use of one polarizer can be reduced when combined with a display panel such as a liquid crystal display panel (LCD) or an organic light emitting diode display panel (OLED), and therefore not only the anti-peeping control effect is achieved but also the cost and thickness reduction and the need to maintain luminance can be satisfied.

4) The anti-peeping effect is enhanced by using the anti-peeping control device with a reflective polarizer to reflect ambient light.

5) The viewing angle shift can be corrected by the anti-peeping control device when the backlight module uses the reverse prism sheet and the deflection of the extending direction of the prism column of the reverse prism sheet causes the viewing angle shift.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first polarizer, the second polarizer, the first alignment layer and the second alignment layer are only used for distinguishing various elements and do not limit the number of the elements.

What is claimed is:

1. An anti-peeping control device, comprising a first polarizer, a second polarizer and a liquid crystal box, wherein
the first polarizer comprises a first transmission axis having a first axial direction;
the second polarizer is disposed opposite to the first polarizer, the second polarizer comprises a second transmission axis having a second axial direction, a relationship between the first transmission axis and the second transmission axis satisfies at least one of the following conditions: (1) an included angle is formed between the first axial direction and the second axial direction, and the included angle is between 5 degrees and 15 degrees; and (2) the first axial direction is parallel to the second axial direction, the first axial direction is not parallel and not perpendicular to any side edge of the first polarizer, and the second axial direction is not parallel and not perpendicular to any side edge of the second polarizer;
the liquid crystal box is disposed between the first polarizer and the second polarizer, the liquid crystal box comprises a first alignment layer, a second alignment layer and a liquid crystal material, the liquid crystal material is disposed between the first alignment layer and the second alignment layer, an included angle between a first alignment direction of the first alignment layer and the first axial direction is selected from one of 0±5 degrees and 90±5 degrees, and an included angle between a second alignment direction of the second alignment layer and the second axial direction is selected from one of 0±5 degrees and 90±5 degrees, wherein the first alignment direction is not parallel and not antiparallel to the second alignment direction.

2. The anti-peeping control device according to claim 1, wherein the liquid crystal box further comprises two substrates and two electrode layers,
the two substrates are disposed between the first polarizer and the second polarizer, and the first alignment layer, the second alignment layer and the liquid crystal material are disposed between the two substrates;
the two electrode layers are disposed between the two substrates, and the first alignment layer, the second alignment layer and the liquid crystal material are disposed between the two electrode layers.

3. The anti-peeping control device according to claim 1, wherein the liquid crystal material is selected from one of a positive liquid crystal and a negative liquid crystal.

4. The anti-peeping control device according to claim 1, further comprising at least one compensation film disposed between the liquid crystal box and the first polarizer or between the liquid crystal box and the second polarizer.

5. The anti-peeping control device according to claim 4, wherein the compensation film is selected from one of the following four types or a combination thereof: (1) a uniaxial structural compensation film of A-plate; (2) a uniaxial structural compensation film of C-plate; (3) a uniaxial structural compensation film of O-plate; and (4) a biaxial compensation film.

6. The anti-peeping control device according to claim 5, wherein a range of a compensation value of in-plane optical path difference (Ro) of the compensation film and a compensation value of out-of-plane optical path difference (Rth) of the compensation film are selected as follows: the compensation value of out-of-plane optical path difference is between 100 nanometers and 800 nanometers; Ro is less than 200 nanometers.

7. The anti-peeping control device according to claim 6, wherein the range of a compensation value of in-plane optical path difference (Ro) of the compensation film and the compensation value of out-of-plane optical path difference (Rth) of the compensation film are selected as follows: the compensation value of out-of-plane optical path difference is 400±200 nanometers or 400±100 nanometers; the compensation value of in-plane optical path difference (Ro) is less than 50 nanometers.

8. The anti-peeping control device according to claim 1, wherein the first polarizer is a reflective polarizer, and the second polarizer is an absorbing polarizer.

9. A backlight module, comprising an optical plate, a light source and an anti-peeping control device, wherein
the anti-peeping control device comprises a first polarizer, a second polarizer and a liquid crystal box, wherein
the first polarizer comprises a first transmission axis having a first axial direction;
the second polarizer is disposed opposite to the first polarizer, the second polarizer comprises a second transmission axis having a second axial direction, a relationship between the first transmission axis and the second transmission axis satisfies at least one of the following conditions: (1) an included angle is formed between the first axial direction and the second axial direction, and the included angle is between 5 degrees and 15 degrees; and (2) the first axial direction is parallel to the second axial direction, the first axial direction is not parallel and not perpendicular to any side edge of the first polarizer, and the second axial direction is not parallel and not perpendicular to any side edge of the second polarizer;
the liquid crystal box is disposed between the first polarizer and the second polarizer, the liquid crystal box comprises a first alignment layer, a second alignment layer and a liquid crystal material, the liquid crystal material is disposed between the first alignment layer and the second alignment layer, an included angle between a first alignment direction of the first alignment layer and the first axial direction is selected from one of 0±5 degrees and 90±5 degrees, and an included angle between a second alignment direction of the second alignment layer and the second axial direction is selected from one of 0±5 degrees and 90±5 degrees, wherein the first alignment direction is not parallel and not antiparallel to the second alignment direction;
the optical plate has a light incident surface and a light emitting surface;
the light source is disposed on a side of the light incident surface;
the anti-peeping control device is disposed opposite to the light emitting surface of the optical plate, and the first polarizer faces the optical plate.

10. The backlight module according to claim 9, further comprising a reverse prism sheet disposed between the anti-peeping control device and the light emitting surface of the optical plate.

11. The backlight module according to claim 10, wherein the reverse prism sheet has a plurality of prism columns arranged in parallel and facing the light emitting surface of the optical plate, an extending direction of the plurality of prism columns is deflected in a first direction with respect to a reference line and therefore has a deflection angle with the reference line, the reference line is perpendicular to any opposite two side edges of the prism sheet, and the first alignment direction of the anti-peeping control device is deflected in a second direction with respect to the reference line.

12. The backlight module according to claim 11, wherein the second direction is opposite to the first direction.

13. A display, comprising a display panel and a backlight module, wherein
the backlight module comprises an optical plate, a light source and an anti-peeping control device, wherein
the anti-peeping control device comprises a first polarizer, a second polarizer and a liquid crystal box, wherein
the first polarizer comprises a first transmission axis having a first axial direction;
the second polarizer is disposed opposite to the first polarizer, the second polarizer comprises a second transmission axis having a second axial direction, a relationship between the first transmission axis and the second transmission axis satisfies at least one of the following conditions: (1) an included angle is formed between the first axial direction and the second axial direction, and the included angle is between 5 degrees and 15 degrees; and (2) the first axial direction is parallel to the second axial direction, the first axial direction is not parallel and not perpendicular to any side edge of the first polarizer, and the second axial direction is not parallel and not perpendicular to any side edge of the second polarizer;
the liquid crystal box is disposed between the first polarizer and the second polarizer, the liquid crystal box comprises a first alignment layer, a second alignment layer and a liquid crystal material, the liquid crystal material is disposed between the first alignment layer and the second alignment layer, an included angle between a first alignment direction of the first alignment layer and the first axial direction is selected from one of 0±5 degrees and 90±5 degrees, and an included angle between a second alignment direction of the second alignment layer and the second axial direction is selected from one of 0±5 degrees and 90±5 degrees, wherein the first alignment direction is not parallel and not antiparallel to the second alignment direction;
the optical plate has a light incident surface and a light emitting surface;
the light source is disposed on a side of the light incident surface;
the anti-peeping control device is disposed opposite to the light emitting surface of the optical plate, and the first polarizer faces the optical plate;
the display panel comprises a panel module;
the display panel is disposed on a side of the anti-peeping control device away from the optical plate or between the optical plate and the anti-peeping control device.

14. The display according to claim 13, wherein the display panel is disposed on a side of the anti-peeping control device away from the optical plate, the display panel further comprises a third polarizer, the third polarizer is disposed on a side of the panel module away from the anti-peeping control device.

15. The display according to claim 14, wherein the display panel further comprises a fourth polarizer disposed on a side of the panel module facing the anti-peeping control device and adjacent to the second polarizer, the fourth polarizer comprises a fourth transmission axis having a fourth axial direction, the fourth axial direction and the second axial direction are not parallel and not perpendicular to each other, and the first axial direction is parallel to the second axial direction.

16. The display according to claim 14, wherein the display panel further comprises a fourth polarizer disposed on a side of the panel module facing the anti-peeping control device and adjacent to the second polarizer, the fourth polarizer comprises a fourth transmission axis having a fourth axial direction, the fourth axial direction and the first axial direction are not parallel and not perpendicular to each other, and the fourth axial direction is parallel to the second axial direction.

17. The display according to claim 13, wherein the display panel is disposed between the optical plate and the anti-peeping control device, the display panel further comprises a third polarizer, and the third polarizer is disposed on a side of the panel module facing the optical plate.

18. The display according to claim 17, further comprising a fourth polarizer disposed on a side of the panel module away from the optical plate and adjacent to the first polarizer of the anti-peeping control device.

19. The display according to claim 13, wherein the panel module is an in-plane switching (IPS) panel module.

* * * * *